US008423975B1

(12) United States Patent
Scallon

(10) Patent No.: US 8,423,975 B1
(45) Date of Patent: Apr. 16, 2013

(54) SYSTEM PERFORMANCE SIMULATOR

(76) Inventor: Gregory M. Scallon, Hunts Point, WA (US)

( * ) Notice: Subject to any disclaimer, the term of this patent is extended or adjusted under 35 U.S.C. 154(b) by 1002 days.

(21) Appl. No.: 10/839,459

(22) Filed: May 5, 2004

(51) Int. Cl.
*G06F 9/44* (2006.01)

(52) U.S. Cl.
USPC .......................... 717/135; 717/104; 717/130

(58) Field of Classification Search .................. None
See application file for complete search history.

(56) References Cited

U.S. PATENT DOCUMENTS

| | | | | |
|---|---|---|---|---|
| 5,960,181 A * | 9/1999 | Sanadidi et al. | ................ | 703/21 |
| 5,978,576 A * | 11/1999 | Sanadidi et al. | ................ | 703/22 |
| 6,856,951 B2 * | 2/2005 | Moona et al. | .................... | 703/22 |
| 6,941,257 B2 * | 9/2005 | Roesner et al. | ............... | 717/130 |
| 6,973,417 B1 * | 12/2005 | Maxwell et al. | ............. | 717/135 |
| 7,167,821 B2 * | 1/2007 | Hardwick et al. | ............. | 703/22 |
| 7,451,447 B1 * | 11/2008 | Deshpande | ................... | 718/102 |
| 7,624,383 B2 * | 11/2009 | Barr et al. | ..................... | 717/135 |
| 7,684,971 B1 * | 3/2010 | Larsson et al. | ............... | 717/135 |
| 8,181,150 B2 * | 5/2012 | Szpak et al. | .................. | 717/104 |
| 2002/0052726 A1 * | 5/2002 | Tajima et al. | ................... | 703/22 |
| 2003/0028863 A1 * | 2/2003 | Reichenthal | ................ | 717/135 |
| 2003/0084156 A1 * | 5/2003 | Graupner et al. | ............ | 709/226 |
| 2004/0148151 A1 * | 7/2004 | Menter et al. | .................. | 717/135 |
| 2004/0230404 A1 * | 11/2004 | Messmer et al. | .................. | 703/1 |
| 2005/0193377 A1 * | 9/2005 | Seto et al. | ..................... | 717/135 |
| 2005/0278707 A1 * | 12/2005 | Guilford | ....................... | 717/130 |
| 2006/0129970 A1 * | 6/2006 | Haas et al. | .................... | 717/104 |

OTHER PUBLICATIONS

Buyya et al., "GridSim: a toolkit for the modeling and simulation of distributed resoruce management and scheduling for Grid computing", Feb. 9, 2002, John Wiley & Sons, Ltd., pp. 1175-1220.*
Balakrishnan et al., "A performance and scalability analysis framework for parallel discrete event simulators", Mar. 1, 2001, Elsevier Science B. V., pp. 529-553.*
White et al., "A Network Performance Application for Modeling, Simulation, and Characterization of Packet Network Behavior", 2003, IEEE, pp. 555-559.*
Thomas Wiedemann, "VISUALSLX—An Open User Shell for High-Performance Modeling and Simulation", 2000, Proceedings of the 2000 Winter Simulation Conference, Technical University of Berlin, Germany, pp. 1865-1871.*
Bagrodia et al., Performance Evaluation of Conservative Algorithms in Parallel Simulation Languages, Apr. 2000, IEEE, pp. 395-411.*
Bart Sinclair, "Simulation of Computer Systems and Computer Networks: A Process-Oriented Approach", Feb. 15, 2004, Rice University, Houston, Texas, pp. 1-261.*
Greg Scallon, "Model Based Development", May 4, 1999, Software Technology COnferences, pp. 1-43.*

(Continued)

*Primary Examiner* — Thuy Dao
*Assistant Examiner* — Ben C Wang
(74) *Attorney, Agent, or Firm* — Kenneth Paley

(57) ABSTRACT

Generally and not exclusively, there is disclosed a method and a routine that may be operated upon by a processor and is contained in a media, to execute a simulation of a system. The routine operates upon a database whose contents are a standardized formulation of the system to be simulated. Generally and not exclusively the standardized database is disclosed. Generally and not exclusively a language is disclosed that describes the characteristics of the system to be described in the database, and that can be converted by a compilation process to yield the data in the database.

75 Claims, 10 Drawing Sheets

OTHER PUBLICATIONS

Ledeczi et al., "The Generic Modeling Environment", 2001 IEEE, pp. 1-6.*

Schmidt et al., "Applying Model-Integrated Computing & DRE Middleware to High-Performance Embedded Computing Applicaions", 202, HPEC'02 Workshop, pp. 1-16.*

Ledeczi et al., "Modeling Methodology for Integrated Simulation of Embedded Systems", Jan. 2003, ACM, pp. 82-103.*

Wendy Roll, "Model-Based Integration of Reusable Component-Based Avionics Systems", OMG RTWS 2003, Boeing, pp. 1-18.*

Mukherjee et al., "Performance Simulation Tools", Feb. 2002 IEEE, pp. 38-38; <http://ieeexplore.ieee.org/stamp/stamp.jsp?tp=&arnumber=982914>.*

Zhang et al., "SMP-SIM: an Event-Driven Performance Simulator for SMP", 2012 IEEE, ICSAI 2012, pp. 269-273; <http://ieeexplore.ieee.org/stamp/stamp.jsp?tp=&arnumber=6223614>.*

Kuhn et al., "A Simulator Interconnection Framework for the Accurate Performance Simulation of SDL Models", 2006 Springer-Verlag Berlin Heidelberg, SAM 2006, LNCS 4320, pp. 133-147; <http://link.springer.com/chapter/10.1007%2F11951148_9?L1=true#page-1>.*

Solomon et al., "Business Process Performance Prediction on a Tracked Simulation Model", 2011 ACM, PESOS' 11, May 23-24, 2011, Honolulu, USA, pp. 50-56; <http://dl.acm.org/citation.cfm?id=1985394.1985402&coll=DL&dl=GUIDE&CFID=179162170&CFTOKEN=62443780>.*

* cited by examiner

SYSTEM PERFORMANCE SIMULATOR

TECHNICAL FIELD

This invention relates generally to a simulation apparatus and method, and more particularly but not exclusively to a standardized simulation apparatus and method for simulating the performance of a system.

BACKGROUND

Simulation of a system to determine the performance of the system and its individual constituents, is conventionally implemented by developing a customized model of the system. Then a customized program for implementing the model in a programmed computer is developed. This conventional approach is not only time consuming, but is also so specifically customized to a particular model, that change to the system in the iterative process of system development, requires a redesign and a re-code of the program. Moreover, because each program is customized, the results generated by two programs are not necessarily comparable.

SUMMARY

Generally and not exclusively, a standard routine for executing a simulation of a system is disclosed. The standard routine operates upon a database whose contents are a standardized formulation of the system to be simulated. Changing the system generally requires only changing the entries in the database, and not changing the routine. Moreover, generally and not exclusively, the standardized database is disclosed.

Moreover, generally and not exclusively, a method and an apparatus of entering data in the database is disclosed. This method and apparatus includes a language that describes the system design in statements that can be converted by a compilation process to yield the data in the database.

BRIEF DESCRIPTION OF THE FIGURES

Non-limiting and non-exhaustive embodiments are described with reference to the following figures, wherein like reference numerals refer to like parts throughout the various views unless otherwise specified. With regard to the described methods, the order of description should not be construed to imply that these operations are necessarily order dependent.

DETAILED DESCRIPTION

Figure 1:
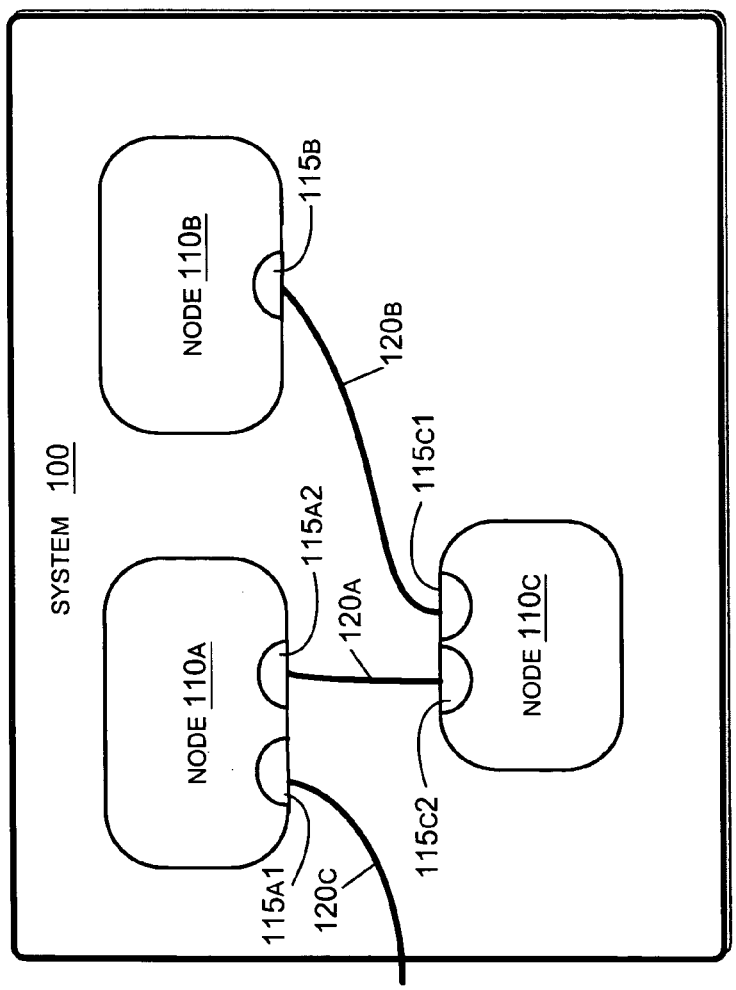
FIG. 1 is an embodiment of an illustrative system to be simulated comprising individual nodes coupled by communication paths.

Referring now to FIG. 1, there is shown a view of an illustrative system 100, illustratively a computing system, whose performance may be simulated. The system 100 includes 3 exemplary nodes 110, portrayed as a node 110A, a node 110B, and a node 110C. A node 110 may include at least one CPU, memory, and an operating system. Moreover, a node 110 may include at least one I/O port controller 115 for interfacing with a communication path 120. The system 100 includes exemplary I/O port controllers 115A1 and 115A2 in node 110A, an exemplary I/O port controller 115B in node 110B, and exemplary I/O port controllers 115C1 and 115C2 in node 110C. Illustratively each node 110 is coupled to at least one other node, and/or to a device outside the system 100, by a communication path 120, illustratively portrayed as a communication path 120A for communicating between nodes 110A and 110C, a communication path 120B for communicating between nodes 110B and 110C, and a communication path 120C for communicating between node 110A and a device outside the system 100. In operation, each node executes processes. The processes each contain a specific sequence of software steps that are dispatched in operation according to the specification of the process. Processes are triggered based upon events or the synchronized with the passage of time. Upon triggering a process, the sequence of software steps is dispatched.

Figure 2:
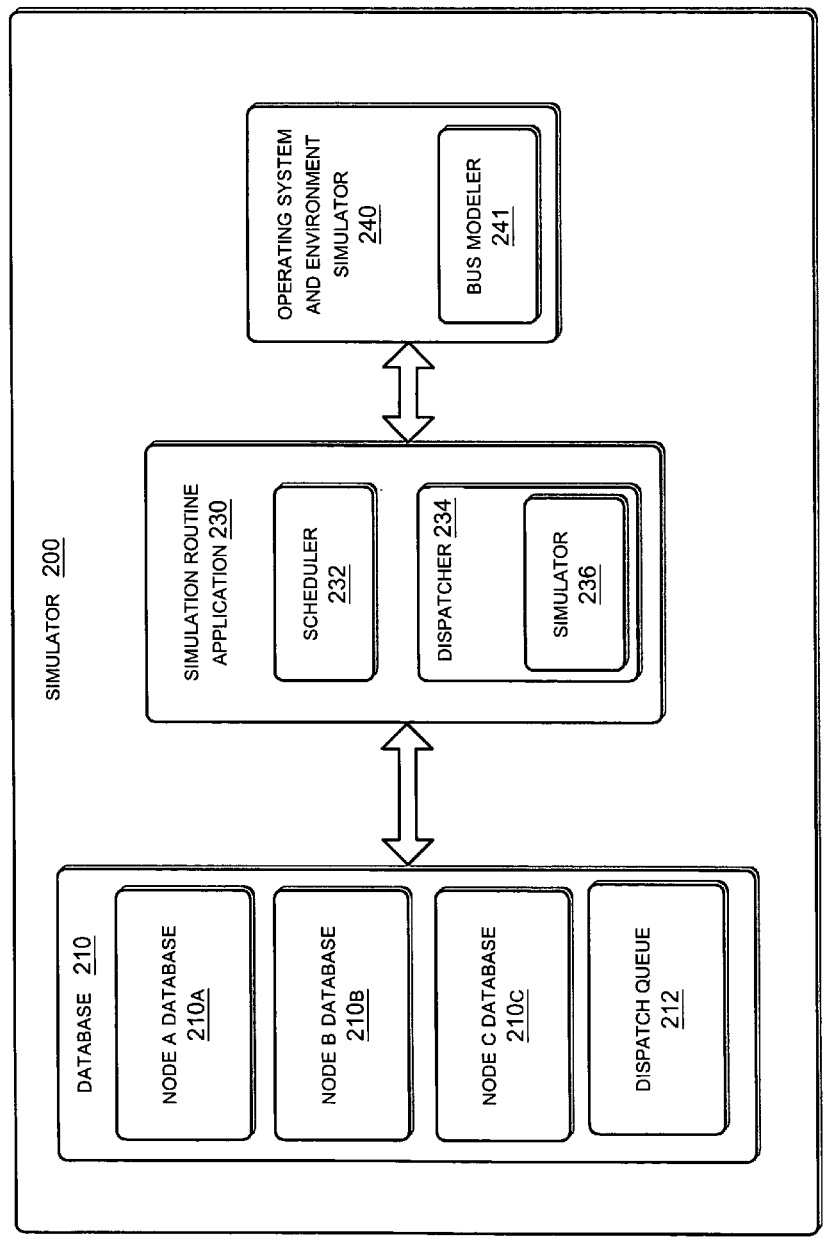
FIG. 2 is a block diagram of a software system for simulating the performance of a system.

Referring to FIG. 2, there is shown a simulator 200 for simulating the performance of a system. The simulator 200 is a software system that when operated upon by at least one processor, causes the processor to simulate the performance of the system. The simulator 200 includes a database 210, a simulation routine application 230, and an operating system and environment simulator 240.

The database 210 in operation stores data describing the predefined characteristics of the system being simulated, in a predefined format. The simulation routine application 230, and the operating system and environment simulator 240 are configured to use the data in the database 210 in operation, customizing an executing simulation routine application 230 to the characteristics of the system whose performance is being simulated. The characteristics of the system to be stored in the database 210 are predefined, and the format of the database 210 is predefined, so that the simulation routine application 230 and the operating system and environment simulator 240 are standard, and need not be redesigned and/or redeveloped to customize either to the characteristics of the system to be simulated.

The predefined characteristics of the system stored in the database 210 include data describing the system's resources that effect system performance. The term resource refers to something with a capacity to be utilized to execute a process. Illustratively, in one implementation for a computing system to be simulated, each node is defined as having a CPU(s), a memory, and port(s). In one implementation, the database 210 is configured in a format that comprises storing the characteristics of the resources separately from the characteristics of the processes, such that the characteristics of the process and the characteristics of the resources can each be modified independently of one another. Moreover each node is configured to execute at least one process, and may be coupled by communication paths, commonly buses. In one implementation, the simulation routine application 230 processes each node separately, maintaining a separate utilization timeline for each component of the node. Interactions between nodes are modeled by messages and signals sent between the nodes. As such, in one implementation the database 210 is formatted separately for each node of the system. Thus, for a system having three nodes termed illustratively node A, node B and node C, the database 210 includes a separate sub-database 210A for node A, a separate sub-database 210B for node B, and a separate sub-database 210C for node C.

The portion of the simulation routine application 230 configured to read the correlation between the event and the process in the database may be termed a scheduler routine 232. In one implementation, the operating system and environment simulator 240 generates external I/O interrupts, delayed triggers and sync interrupts for the scheduler routine 232 to integrate as synchronous and asynchronous events. In one implementation, the scheduler routine 232 incorporates process priority to deterministically control execution of the processes in each CPU of a node, for each node. In one implementation, the events have a relative priority and the scheduler routine 232 incorporates the relative priority of the event as the relative priority of the process. The database 210 stores process priority as a process attribute. Process priority is the execution priority of the process relative to the execution priority of other processes in the CPU of the system to be simulated, and is utilized by the operating system/executive of the CPU to be simulated, to execute the process according to its relative priority. In one implementation, the scheduler routine 232 is configured to trigger processes for each CPU of each node that have an equal priority, in the order in which they are triggered, i.e. first in-first out order.

In one implementation, the scheduler routine 232 writes an identification of the triggered processes to a portion of the database 210 termed the dispatch queue 212. A portion of the simulation routine application 230 configured to simulate the execution of the performance of the process may be termed a dispatcher routine 234. The dispatcher routine 234 is configured to select the highest priority process from the dispatch queue 212, the most urgent process to be executed. The dispatcher routine 234 launches the next sequential step from that process. Each process is defined as a sequence of steps, and each process in the database 210 associates the process with its constituent steps. The dispatcher routine 234 in executing a process executes in order the steps associated with the process. For nodes with multiple CPUs, each CPU is processed separately by the dispatcher routine 234. In one implementation, there is a separate dispatch queue 212 for each CPU of each node. In another implementation, there is a common dispatch queue 212 for the CPUs of a node, and the dispatcher routine 234 in simulating a CPU is configured to execute only the processes to be run on that CPU from the dispatch queue 212. In one implementation, the database 210 associates dependency and data lock test specification data with each process step, and the dispatcher routine 234 is configured to interpret this data, and to evaluate and execute the dependency and lock tests. If the evaluation fails, the dispatcher routine 234 is configured to inhibit the process at this instant and to select another process from the dispatch queue 212. In one implementation, uninhibited steps cause the dispatcher routine to update appropriate dependency and data locks and the progress pointer associated with each process in the database 210, and then launch to the step. The dispatcher routine 234 is configured to update the appropriate dependency and lock tests when a step completes.

In the foregoing description of the scheduler routine 232 and the dispatcher routine 234, the scheduler routine 232 and the dispatcher routine 234 need not be separate routines, but may be part of the same routine, that same routine configured to execute the functions of the scheduler routine 232 and the dispatcher routine 234 from instructions that are integrated within the simulation routine application 230.

In the database 210, the resources may be separated into structural characteristics and performance characteristics. What follows is an exemplary listing of predefined resource characteristics pertinent illustratively to a simulation of a computing system, that may commonly be extracted from a system to be simulated and put into the database 210 for operation by the simulation routine application 230. The database 210 in operation stores this data in a predefined format to be operated upon by a standard simulation application routine 230, and operating system and environment simulator routine 240. In the development of the database 210 contents, data not specifically provided is given a default value. An implementation of the simulation routine application 230 described with reference to FIGS. 7 and 8 uses the described characteristics to simulate the performance of the system. Fewer characteristics may enable a simulation having less accuracy, because certain characteristics of the system will not be accounted for in the simulation.

In one implementation, the database 210 for a node contains three types of information. Structural characteristics define the organization and physical relationships between the components that constitute the node. Operational characteristics define the dynamics that control the behavior of the system as interacting component parameters. Performance characteristics define the temporal capability and overhead costs of each component, and in one implementation include behavioral attributes.

Each node of the system to be simulated has what are termed herein structural characteristics that define its constituent resources. Illustratively, for a computing system, these structural characteristics include processors, memory, and ports. Operational characteristics define the triggering conditions for each process. Illustratively, interrupt triggers are caused by external events, periodic triggers are fired at predefined synchronous intervals, and aperiodic triggers are initiated from within a process.

For a CPU, in one implementation the CPU's structural characteristics include the hosting node, attached memory and available ports. For a CPU, in one implementation the CPU's operational characteristics include the synchronization (sync.) signal rate or generator and associations of external events to processes. For a CPU, in one implementation the CPU's performance characteristics include overhead for context switching (changing CPU execution from one process to another process), for task dispatching (the cost to launch a task within a process), for control step execution (the control processing overhead to execute a control or system control step), the throughput (expressed illustratively as operations/second), I/O interrupt processing time overhead, task, and multiprocessing characteristics e.g. the cost (CPU time or instructions) to test a dataset read/write lock, cost to set a dataset read/write lock, and cost to unlock (i.e. back out a lock setting) for a dataset read/write lock.

For a memory, in one implementation the performance characteristics are storage capacity, transfer rate overhead, transfer rate, and sizes of each storage module managed module. The system memory characteristics include the physical storage size of every module in a node and the dynamic location assigned to each. Modules that are designated as permanently resident (i.e. loaded once and not unloaded) are listed. The structure of the memory is specified as an amount of ROM and of RAM that is physically available, Memory that is reserved for the operating system including routines, buffers and workspace.

For a port, in one implementation, the port's structural characteristic is its maximum bandwidth expressed illustratively as bytes moved per second and the physical transfer word width expressed in data bits transferred in parallel.

For a communication path (commonly a bus), in one implementation the communication path's structural characteristics define the physical nodes to which it is attached and the physical transfer word width expressed in data bits transferred in parallel. For a bus, in one implementation the bus's performance characteristics are its transfer rate (expressed illustratively as bandwidth) and its transmission buffer sizes. Bus operational characteristics include protocol parameters e.g. packet size limits (maximum and minimum), preamble and postamble overhead costs expressed in time to transfer a given data quantity.

Operational characteristics include the costs to move a transmission from one node to another node. Synchronous buses are defined illustratively by the characteristics of the idle pattern sent. The CPU cost to initiate a transmission (if any) is characterized, and illustratively collision protocols (e.g. TCP-IP) are defined by the collision detection overhead and the resolution overhead, such as the time period the bus resolves contention and does not transmit payloads. Some buses (e.g. Mil Std. 1553 bus) differentiate between messages and commands so both are defined illustratively by preamble and postamble parameters characteristics. Some buses are based on time division multiplexing. These are illustratively defined by number of allocation slots in a full epoch cycle, and by the physical size of each slot. Each slot may be considered as a separate bus with a full bandwidth but available only periodically for a single slot time. The specific time slot assignment is an operational characteristic for the bus. Other bus characteristics defined include instruction size of the bus controller, and memory reserved for buffering requested messages in a node.

The predefined characteristics of the system that are to be stored in the database 210 may include data describing the process(es) executed by each node, and each process step. A task may be a constituent of more than one process and may appear multiple times in a process as different steps. Each task instance is characterized independently. For a process, in one implementation the process's structural defined characteristics are relative priority, initial state, first trigger, execution steps including user tasks, suspend & resumes, triggers, aborts and ends, conditionals (ifs), repetitions (loop/whiles), alternations (everys), else and terminate options, I/O requests, dataset backups (e.g. copies and swaps) and module saves and loads. Process characteristics also describe periodic trigger rate and initial phasing for periodic processes. These are illustratively expressed as counts of synchronization (sync) signals.

Process operating characteristics described include the maximum depth of the process trigger queue, e.g. an identification of waiting triggers that are postponed until execution of a process competes. The aggregate scratch workspace is computed in the converter application 910 to represent data space needed to hold temporary data, e.g. stacks used while the process executes. Once a process begins execution, it maintains a step progress pointer identifying the next step to be started in the process. In one implementation an application (e.g. the scheduler 232) maintains a process' dispatch queue entry and suspension counters.

For a process, in one implementation the process's defined performance characteristics are its allocation (its CPU run map), trigger events, and the location of its component modules. For a task instance, in one implementation, the task's structural characteristics are its preemption ceiling and inhibits due to locks and dependencies. For a task, in one implementation the task's performance characteristics are its physical size, per instance run-time expression, object flows, interrupt generation, variable assignment, and record variables associated with the actions of the task model.

The predefined characteristics of the system that are to be stored in the database 210 also include data describing the data sets accessed by a task into a memory. For a data set, in one implementation the data set's structural characteristic is the parallel access write protection required to maintain data integrity, and in one implementation the performance characteristics are the physical size of the data set, and residency and initial location of the data set.

The output from the predefined system characteristics stored in the database 210 also include data describing the messages transmittable from one node to another on a bus. For a data set, in one implementation the transmission's structural characteristic are its process request step information, its transmission priority, its message type (command or message), its destination or broadcast, its forwarding (bridging), and its end-action options including: trigger, abort, resume, and additional requested transmissions. For a transmission, in one implementation the transmission's performance characteristic are it payload size, an identification of the bus used, an identification of the CPU effected, an identification of the launch node, its request backlog, and the buffering to be applied.

In one implementation, the database 210 entries map external events to interrupt triggers for specific processes. Other database entries define the trigger intervals as a count of sync signals for periodic processes. The database 210 entries also define initial triggers and priorities for each process and identifies the processors allowed to execute each process. The database 210 entries describe the initial conditions for all components.

The database 210 also maintains operational status throughout a simulation. Each process has a progress pointer identifying the next step to be launched and a suspension counter maintaining the number of sync signals until the suspension expires. The database 210 maintains various operational parameters such as loop counts, preemption stacks, trigger queues, instrumentation statistics, object repositories and delay chains.

The database also stores the particular steps defining each process. There are four kinds of steps: user tasks that represent useful work, sequence control steps that alter the linear execution order of steps within the process, process control steps that manipulate the triggering, suspension, and ending of processes and the fourth category called system controls that request I/O transactions, backup dataset content and load and save modules between memory and backing store.

The database illustratively contains defined sequence control step data composed of primitives that when operated upon by the dispatcher routine 234, allow for a modification of the progress pointer described with reference to FIG. 8. For instance, these primitives may provide the following control directive data: a "looping" construct, an "end of loop" construct, an "if x then" construct, an "else" construct, and an "end of if" construct.

The database illustratively contains defined process control step data composed of primitives that interact with the scheduler routine 232, and allow for process triggering, process termination, and controlled suspension of process execution.

The database illustratively contains system control step data composed of primitives that interact with the operating system and environment simulator 240. This data illustratively provides for I/O requests, dataset backup, and load and save memory modules to backing store.

Figure 3:
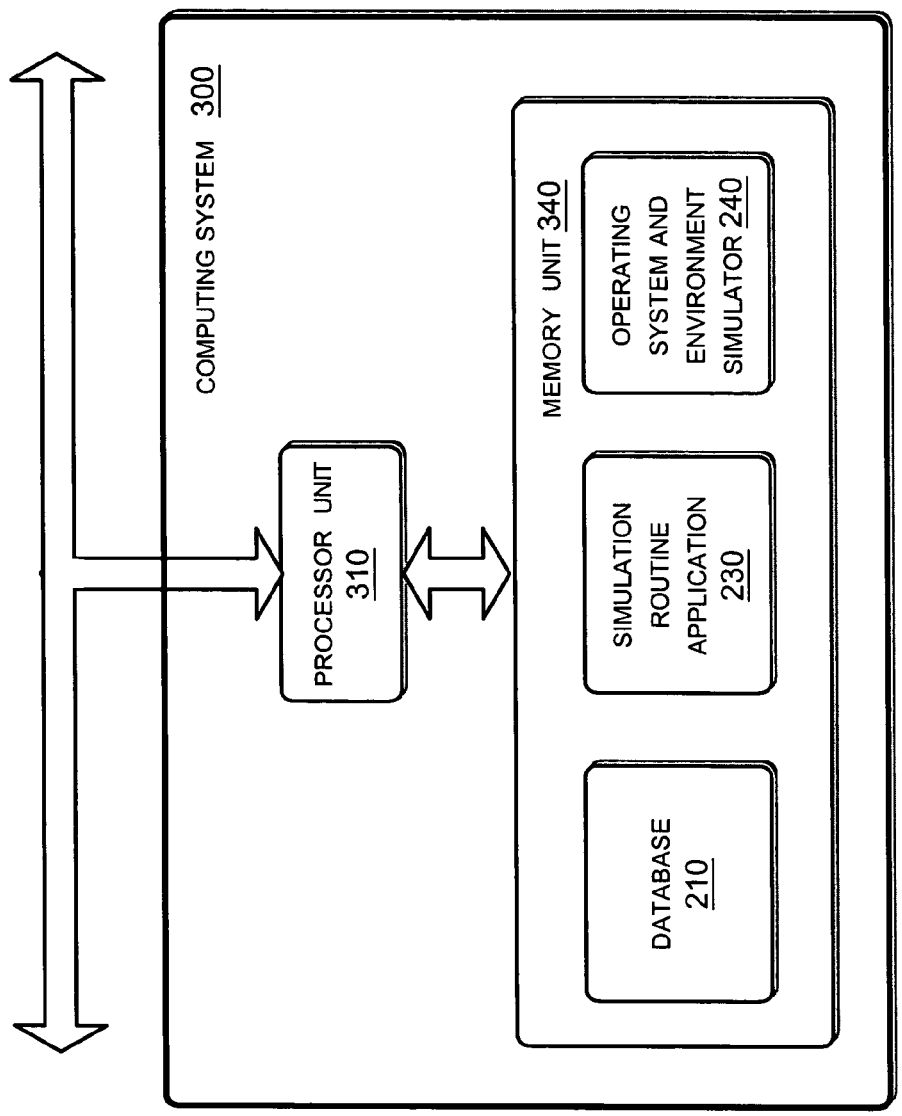
FIG. 3 is a block diagram of an exemplary computing system for simulating the performance of a system.

Referring to FIG. 3, one implementation of a computing system 300 for simulating the performance of a system includes a processor unit 310 and a memory unit 340 that together form a programmed computer. The programmed computer in operation performs the logical operations of a simulator.

The processor unit 310 includes one or more processors each capable of executing program instructions on data. The memory unit 340 stores the database 210, the simulation routine application 230, and the operating system and environment simulator 240. It is understood that the memory unit 340 may in one implementation be multiple physically separate units that are each coupled to the processor unit 310. The simulation routine application 230 and the operating system and environment simulator 240 when executed by the processor unit 310 cause the processor unit 310 to perform the acts described herein, including those described with reference to FIG. 2, to block 430 of FIG. 4, to blocks 620 and 630 of FIG. 6, to FIG. 7 and to FIG. 8. It is understood that a computing system may include other devices, such as bus systems, controllers, I/O, user interface, and memory that have not been explicitly drawn in FIG. 3.

It is specifically contemplated that multiple physically separate memory units (not shown), including non-volatile memory devices, may together store the database 210, the simulation routine application 230, and the operating system and environment simulator 240, or portions thereof. To operate the computer system 300, the multiple physically separate memory units (not shown) may be loaded into the memory unit 340 for execution by the processor unit 310. At least some of the routines stored in the memories may be stored in a compressed form, and then decompressed for execution.

Figure 4:
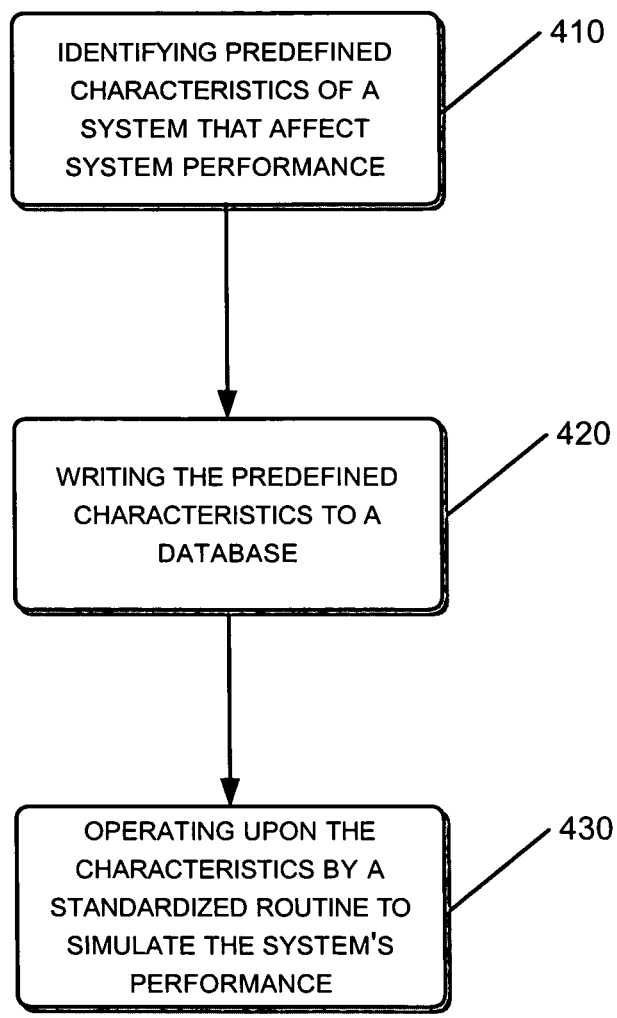
FIG. 4 is a flow chart of an embodiment of a method to simulate the performance of a system by writing predefined characteristics of the system that affect system performance to a database, and operating upon the database with a simulator routine.

Referring to FIG. 4, the method 400 to simulate the performance of a system includes in block 410 identifying predefined characteristics of the system that affect system performance. As described with reference to FIGS. 2 and 9, these characteristics include pre-defined system resource characteristics, and predefined process descriptions that a standard simulation routine application will use as data to simulate the system's performance. In block 420, the predefined characteristics identified in block 410 are written (stored) in a database, such as illustratively database 210. In block 430, the predefined characteristics written (stored) in the database are read by a standardized routine, such as illustratively the simulation routine application 230, that simulates the system's performance based on the read characteristics.

Figure 5:
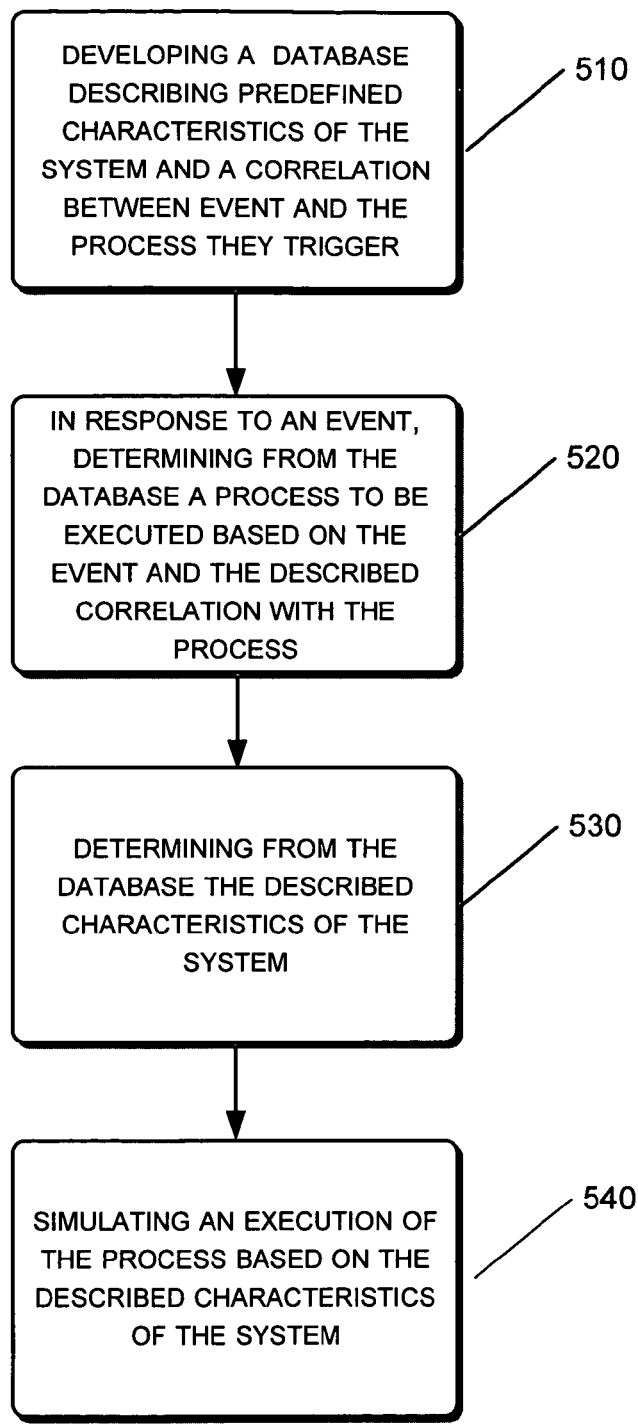
FIG. 5 is a flow chart of an embodiment of a method to simulate the performance of a system, by developing a database describing the system and simulating an execution of the process based on the described system.

Referring to FIG. 5, the method 500 to simulate the performance of a system includes in block 510 developing a database such as illustratively database 210 as described in this specification, that describes the predefined characteristics of the system and a correlation between events and the processes they trigger. In block 520, in response to an event, the method includes determining from the database a process to be executed based on the event and the described correlation with the process. In block 530, the method includes determining from the database the described characteristics of the system. In block 540 the method includes simulating an execution of the process based on the described characteristics of the system. Elsewhere in this specification, the simulation routine application 230 is described as illustratively containing instructions that will be executed by a process causes the processor to perform the actions described in blocks 520, 530, and 540.

Figure 6:
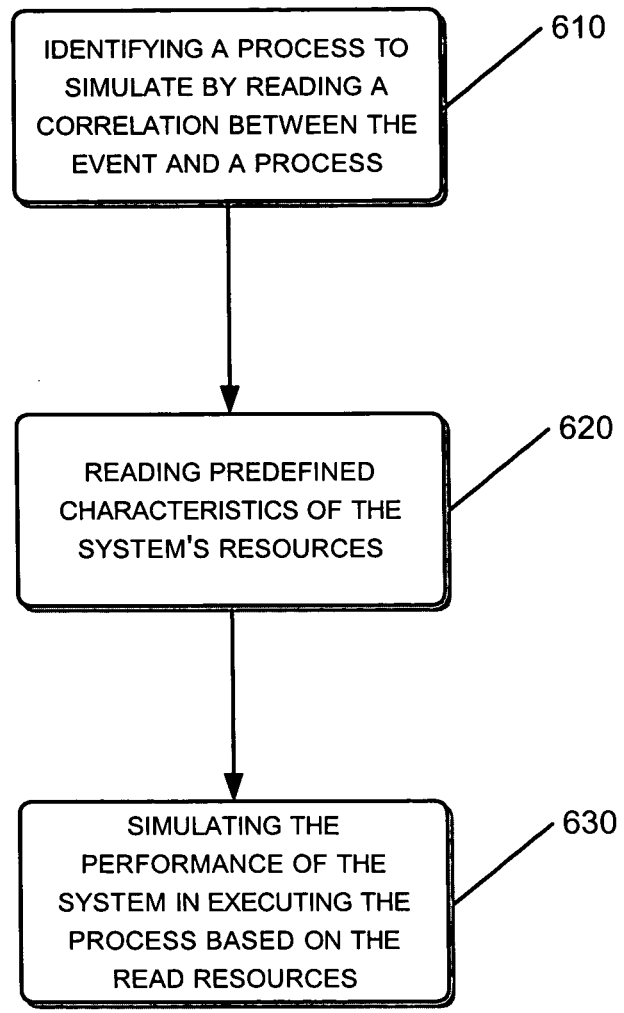
FIG. 6 is a flow chart of an embodiment of a method to simulate the performance of a system, by reading the system's characteristics from a database that stores predefined characteristics.

Referring now to FIG. 6, the method 600 to simulate the performance of a system includes in block 610, in response to an event, identifying a process of the system modeled in the database 210 to execute in response to the event. The simulation routine application 230 is to read in the database 210 a correlation between the event and the process described in the database. In block 620, the simulation routine application 230 is to cause the processor to read predefined characteristics of the system's resources to execute the process described in the database. In block 630, the simulation routine application 230 is to simulate an execution of the performance of the process based on the read resources.

Figure 7:
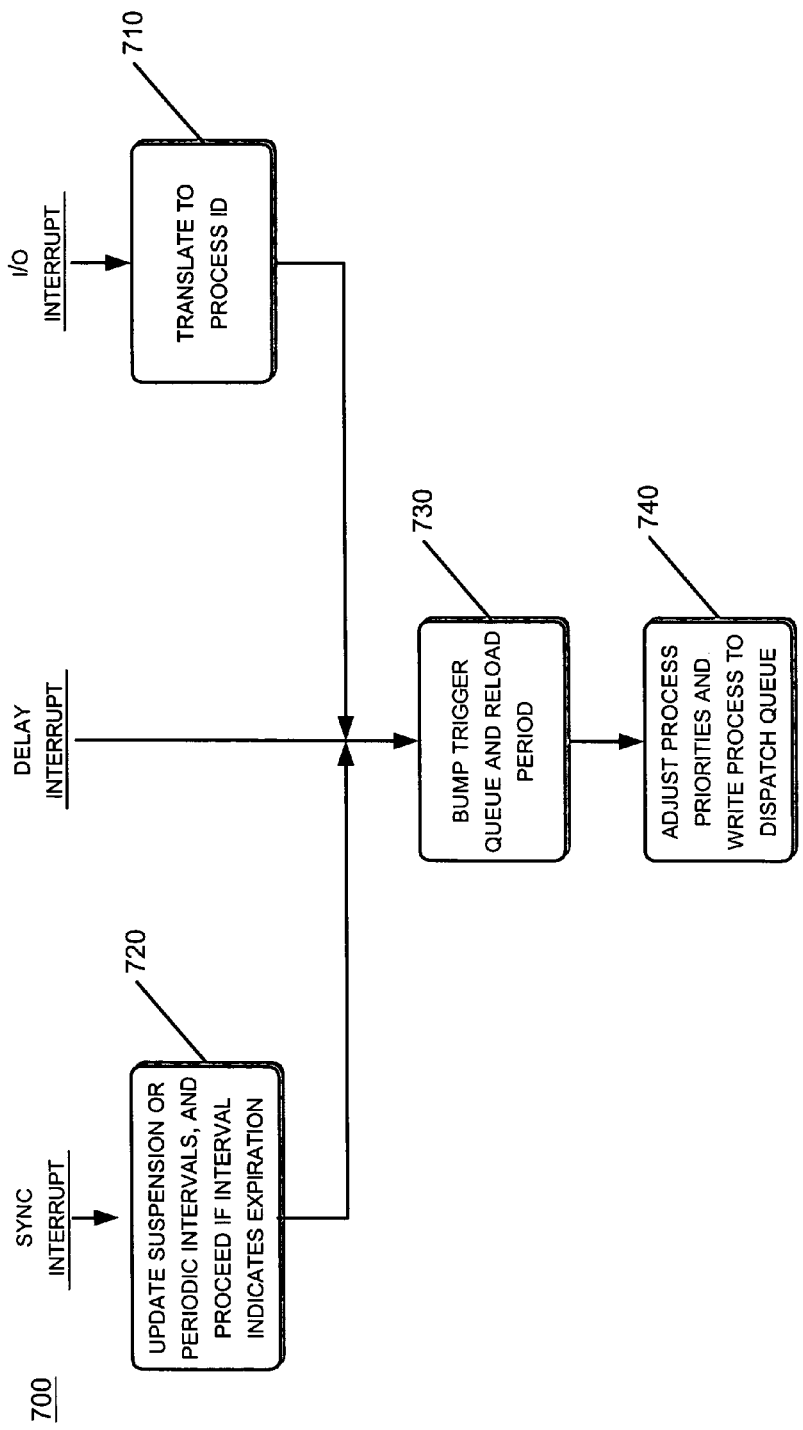
FIG. 7 is a flow chart of an embodiment of a method caused by an executing scheduler routine.

Referring to FIG. 7, a method 700 caused by an executing scheduler routine 232 responds to events by selecting processes to compete for CPU resources, as they would in the actual node. The operating system and environment simulator 240 produces the signals operated on by the executive scheduler routine 232. In one implementation described herein, the processes selected for simulation are placed in the dispatch queue 212, in simulated competition for CPU resources, and selection for simulated execution by the dispatcher routine 234. In block 710, the scheduler routine 232 receives and responds to an I/O interrupt from the operating system and environment simulator 240. An I/O interrupt is an external interrupt. An I/O interrupt includes data identifying the process to be triggered, or data that implies that process. In one implementation, events such as I/O interrupts have an identifying event code. The I/O interrupts are translated into an identification of the process to be triggered in block 710. In one implementation, a lookup table is implemented, and the event code is associated with the process to be triggered in the lookup table. The lookup table is stored in the database 210. In one implementation, if the I/O interrupt is not to trigger a process, then the events either do not reference an entry in the lookup table, or do reference an entry in the table to indicate a null process for triggering, and the dispatcher routine 234 does not attempt further trigger processing. If the I/O interrupt is to trigger a process, then Block 730 is to be executed after process identification.

In block 720, the scheduler routine 232 receives and responds to a synchronization (sync signal) interrupt from the operating system and environment simulator 240, by updating timed process suspension intervals. The synchronization signal decrements any active counters for counting these suspension intervals.

The scheduler routine 232 maintains a separate counter for each periodic process as necessary. If a periodic counter after decrementation by the sync interrupt indicates a trigger time, block 730 is to be executed. In one implementation, active counters have a value greater than zero, and if a counter decrements to a value of zero, block 730 is to be executed.

Block 730 is executed after a time maintained by a periodic counter in block 720 is expired, after a successful identification of an interrupted process in block 710, or in response to a delay interrupt. A delay interrupt in one implementation is a software initiated aperiodic interrupt delayed by the operating system and environment simulator 240. In block 730, for the triggered process both the trigger queue is incremented and the period counter is reloaded for periodic processes. In one implementation, if the trigger queue overflows (indicating that the trigger request exceeds a maximum allowable number of queued process triggers), the processing of the scheduler interrupt terminates and also an error message may be generated. If this is the only entry in the trigger queue for this process, the process is written to the dispatch queue 212.

In block 740, the triggered process is written to the dispatch queue 212. A database list holds the priority assigned to this process. The process is written into the dispatch queue based on its priority or other data in the database indicating how the process is to be managed. In one implementation the process is placed in the dispatch queue, to be processed after any existing process already in the dispatch queue having a more urgent or equivalently urgent priority for a first in-first out scheduling policy. The resulting position in the dispatch queue 212 reflects the appropriate relative priority of the process at the trigger instant.

Figure 8:
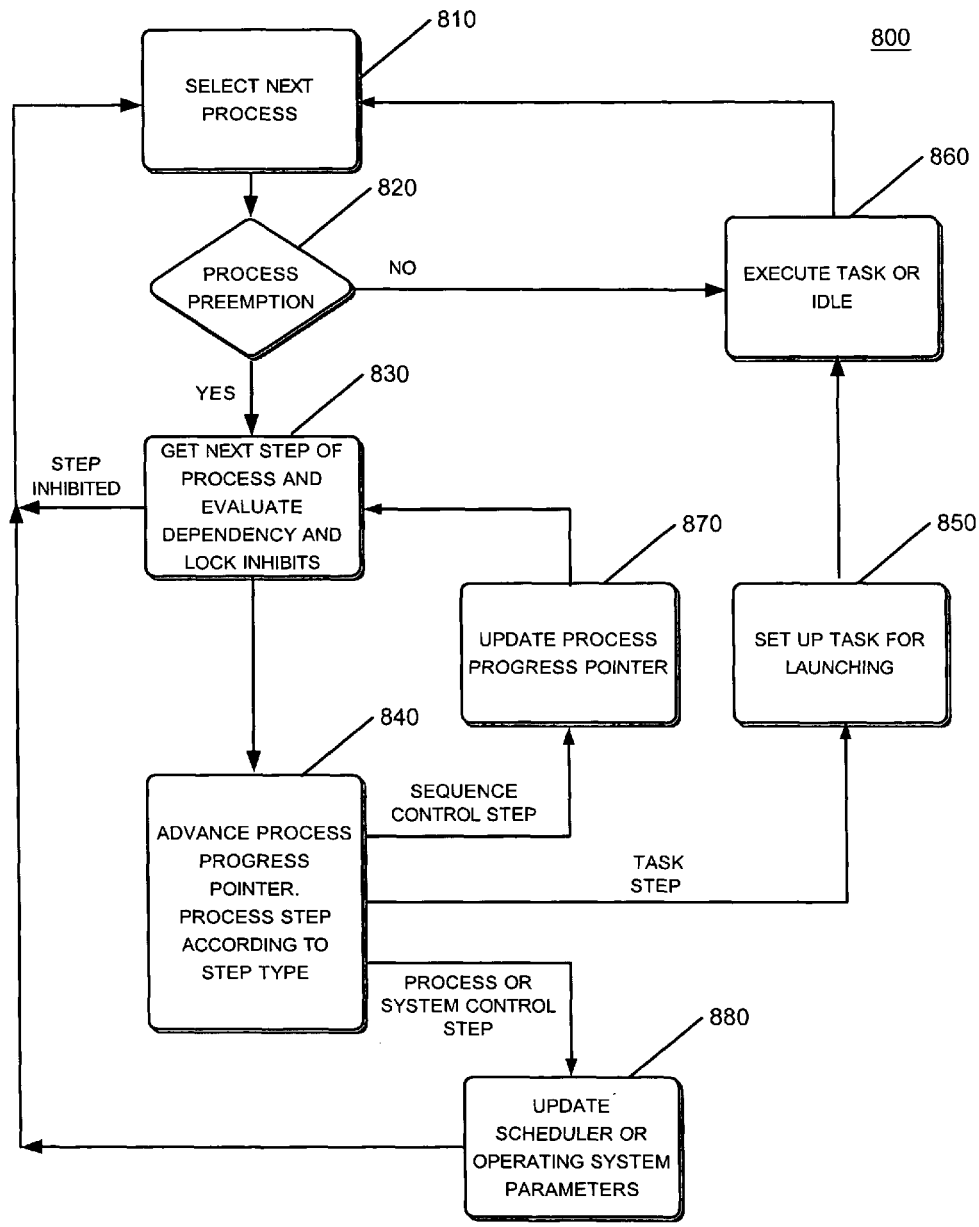
FIG. 8 is a flow chart of an embodiment of the method caused by an executing dispatcher routine.

Referring to FIG. 8, a method 800 caused by an executing dispatcher routine 234 manages the task stream for each CPU of each node. The following description describes the processing for one CPU of one node. In the implementation described, only task steps may be preempted, all other steps of a process are not preempted and execute to completion. In bock 810, the dispatcher routine 234 selects from the dispatch queue 212 the most urgent process that is not in suspension and that can run in the CPU. In block 820, if the CPU is already running a process and if the selected process is not more urgent than a process already running or if no process was selected in block 810, then the process that is already running is not preempted and block 860 is to be executed. If the selected process is more urgent than the process that is already rerunning on the CPU, or if the CPU is not running a process, then block 830 is to be executed.

In block 830, the next step from the selected process is to be selected for processing. A pointer (termed the "progress pointer") that is associated with the execution process is read, and the step to be launched is identified. The operating characteristics of the step are read from the database 210. In one implementation for a multi-CPU node, the dependency and lock tests for this next step are evaluated. If the evaluation indicates that this next step is to be inhibited, then block 810 is to be executed to find the next most urgent process from the dispatch queue. Otherwise, preemption is invoked and the step is to be launched.

In block 840, the progress pointer for this process is updated to identify the next step for future execution. The current step is classified according to whether the step identifies a task step, a sequence control step, a process control step, or a system control step. If the current step is a task step, then block 850 is to be executed. If the current step is a sequence control step, then block 870 is to be executed. If the current step is a process control step or is a system control step, then block 880 is to be executed.

In block 850, the task step is set up for simulated launching. The read dataset arguments associated with the task are logically attached to the task. The dependency and dataset locks are adjusted. The simulator application 236 (FIG. 2) is launched for simulating the task. Simulation of a task (and of a bus transmission) is based on the multiple predefined system characteristics stored in the database 210 that are described with reference to FIG. 2. The run-time preemption ceiling associated with this task instance is read from the database 210 to establish the preemption level for future executions of block 820 for this CPU.

In block 860, either the task set up for simulating in block 850 starts simulation, or the resumed prior task for a 'no' preemption determination in block 820 resumes simulation (or idles). When the current task completes, dependency and dataset monitors set in block 850 are unlocked.

In one implementation, the simulator application 236 simulates a system by synthesizing the performance of the system's resources. The simulator application 236 maintains timelines that are each associated with a separate system resource. A timeline simulates a resource by indicating the utilization of the resource by processes or transmissions as a function of time. The utilization of the resource is based on the determination of the competing process and transmission requests to be processed on the resource, and the activity processing time for the process or transmission on the resource. The activity processing time for each task or transmission segment is simulated as an allocation on its timeline.

For a CPU resource, in one implementation, the dispatcher 234 allocates tasks to CPU timelines based on the priority of the process from which the tasks are launched. In one implementation, once launched the dispatcher 234 may elevate a task's preemption ceiling priority value based on database content 210. The total task runtime is calculated when the task is launched. The task can be interrupted at any time and that interrupt may trigger a process with a priority above the current preemption ceiling. In this circumstance, the interrupted task may be preempted by the higher priority process. Eventually, the preempting process releases the CPU and the interrupted task is resumed. The task completes when it has held the CPU timeline for the calculated runtime interval no matter how segmented. In one implementation, the dispatcher 234 determines CPU allocation based on CPU overhead allocations, e.g. interrupts, context switches and dispatches which accompany the sequence.

For a communication path resource, in one implementation, the bus modeler routine block 241 allocates transmission segments to the communication path based on operating system I/O request queues that maintain lists of waiting transmissions for each communication path. These are filled by a CPU step modeler application emulating a communication request from the update scheduler or operating system parameters block 880. When executed, a bus modeler application 241 emulates the transmission segment. Transmission completion signals are passed from the bus modeler 241 to the process scheduler 232 as I/O interrupt events to trigger possible end-action interrupt processes associated with the communication chain. In one implementation, communication end-action activities trigger interrupt processes in the target node that may include transmission requests, triggers, cancels, ends, and resumes.

Transmission requests compete for communication path resources according to their priority. Different priorities can have unique management schemes. In one implementation, the model does not preempt a segment during transmission, but critical priority messages are allocated communication path resources when the current segment completes. Priority (e.g. high priority, medium priority, and low priority) messages are allocated when a current message completes. In one implementation, background messages allocate a single segment when the bus would otherwise be idle. In one implementation, background messages yield the communication path to higher priority message transmissions between segments. Lower priority messages yield to critical messages after each segment transmitted.

In one implementation, the simulator application 236 simulates overhead. The overhead determinants are stored in the database 210 as described with reference to FIG. 2. One overhead component may address context switching. For a CPU timeline, a context switch is invoked if the next step to be processed is selected from a process different than the process last modeled on the timeline. For a communication path timeline, a move master overhead may account for a communication path transmitting from a node different from the node that last transmitted on the communication path. For a CPU, setup overhead may represent the CPU overhead to setup and launch a task. For a communication path, setup overhead may represent the time to transmit headers. Communication path payload lengths may be limited or padded, and may be broken into multiple consecutive segments. The end of a CPU allocation is a task recovery. The end of a communication path allocation may be a transmission, including illustratively the postamble that incorporates a cyclic redundancy check (CRC), checksum, and/or an inter segment gap.

In one implementation, an executing algorithm synchronizes the multiple parallel timelines by determining the timeline to maintain, based on the timeline that extends to the least recent time amongst the other timelines, and executing that timeline next. The activity processing time for each process step is simulated on the timeline for the CPU assigned to execute the step. Transmission segments advance the timeline of the bus to which they are assigned.

In block 870, the sequence control step is set up for simulated launching. The encoded process sequence control step is executed. The process progress pointer is conditionally manipulated by the particular step. The cost of performing the step is allocated to the timeline corresponding to the CPU executing the step. Control continues with a processing of block 830 to select additional work from the selected process. In one implementation, an application limits the quantity of consecutive sequence control steps so as to inhibit infinite looping such as jumping to self. Thus a sequence control step eventually launches a task (block 850), or invokes a process and system control step (block 880).

In block 880, the process control or system control step is launched. A process control step interacts with the scheduler routine 232 by triggering or ending a process or by explicitly changing the value in a suspension counter of a process. System control steps interact with the instructions termed an event and clock routine in the operating system and environment simulator 240 by requesting I/O transmissions, backing up the contents of a dataset, or requesting a process trigger delay by a time interval. Control passes to block 810 to re-select a process because the scheduling parameters may have been altered.

In one implementation, the method 800 includes collecting events and measurements, including the timeline activity, in illustratively a log (not shown) in the database 210. Each resource is represented by a timeline. Therefore, interrogating the log during and/or after the run exposes all user selected event relationships. Dynamic analysis probes can therefore reconstruct a simulation run to access logged data.

Figure 9:
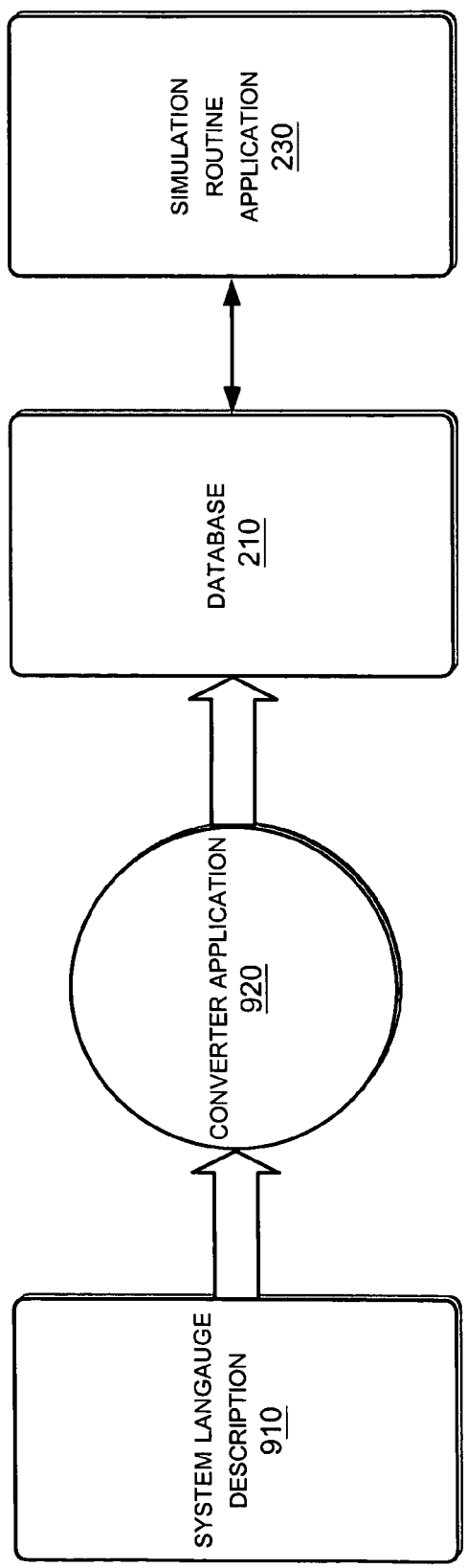
FIG. 9 is a block diagram of a system to identify the system characteristics of a system to be simulated and to store the characteristics in a database, that includes a formal language specification of the system characteristics converted into data in the database.

Referring to FIG. 9, in one implementation the format of the database 210 pertaining to the system data is at least partially based on the simulation routine application 230 accessing the system data efficiently and simply. Therefore, the format of the database 210 is not based primarily on the efficiency of inputting system data into the database 210. A language description 910 of the system to be simulated is operationally coupled to the database 210 by a converter application 920. The language description 910 is organized to represent the system data characteristics of the system in a more intuitive format than the format of the database 210. The converter application 920 is configured to convert the language description 910 to the database 210. For predefined data not specifically provided by the language statements, the converter is configured to provide default values. The language description 910 includes statements based on formal semantic and syntactic rules, and organized according to a finite grammar. Therefore, in one implementation, the converter application is a programmed computer that executes a compiler application, and converts the statements of the language description 910 to a system object code description of the system to be simulated, and/or a description of the to be simulated system in the database 210.

The language description 910 comprises multiple predefined language statements that together identify the predefined data for the database 210. In one implementation, each statement comprises a statement type to define the type of data identified by the statement, and at least one attribute to define the data itself. Each statement is constructed according to a formal syntax so that it is unambiguous and can be converted into data in the database 210 by an algorithm that is aware of the syntax. In an implementation of a computing system, the language statements themselves can be logically grouped as application component statements, resource statements, management statements, and simulation statements.

Application component statements are statements that describe the system tasks, the system data, the system control directives, and the system organization.

The tasks are routines that do useful work and may be constituents of more than one process. Exemplary attributes of task statements will address the required data, execution time, and physical size of each task. The data hold information. Exemplary attributes of data statements will address initial condition of the data, the structure of the data, the format of the data, the content limits of the data, and whether the data is to be protected during a write access. The control directives are statements that identify management controls for both tasks and data, and operating support functions. Exemplary attributes of control directive statements will include triggering a suspension of a process control, engagement logic of a sequence control, I/O loading, and storing memory from backing store. The system organization statements describe the organization of the application into processes defining the tasks and control directives. Exemplary attributes of system organization statements will address defining the sequence of steps that compose a process, the triggering of the process, and the end-actions of the process, e.g. control directive effects on a destination node from the I/O requests.

Resource statements generally describe the physical resources of the system including the CPUs, the channels for communication, the memory, and the organization. Exemplary attributes of CPU statements will address throughput. Exemplary attributes of channels for communication will address data transmission rate and overhead parameters, Exemplary attributes of memory will address capacity, access characteristics, and overhead parameters (e.g. delays and data transmission rate). Exemplary attributes of organization statements will address how the resources are organized into interconnected nodes including the constituent resources of a node, and the linkage of ports by communication channels.

Management statements describe how applications map onto resources. Exemplary attributes of management statements include an identification of logical units with physical units, and how application units compete for resources.

Simulation statements describe how objects move through the simulated system and describe control options. Exemplary attributes include statistical distributions for general assignment expressions, simulation scripts, and utilization evaluation intervals.

In one implementation, the semantic content of at least one language statement type is described by the content of the language statement, and the position of the language statement in the language description 910. Illustratively, in one implementation a process statement may include an attribute describing the node associated with the process; and/or a node statement may include as attributes the processes executed in the node. However, alternatively in one implementation the process statement may not contain information describing its associated node; and the node statement may not contain information describing its associated processes. Instead, the node statement is positioned in a prescribed location relative to the node, thus indicating by that position that it is association with the node.

Figure 10:
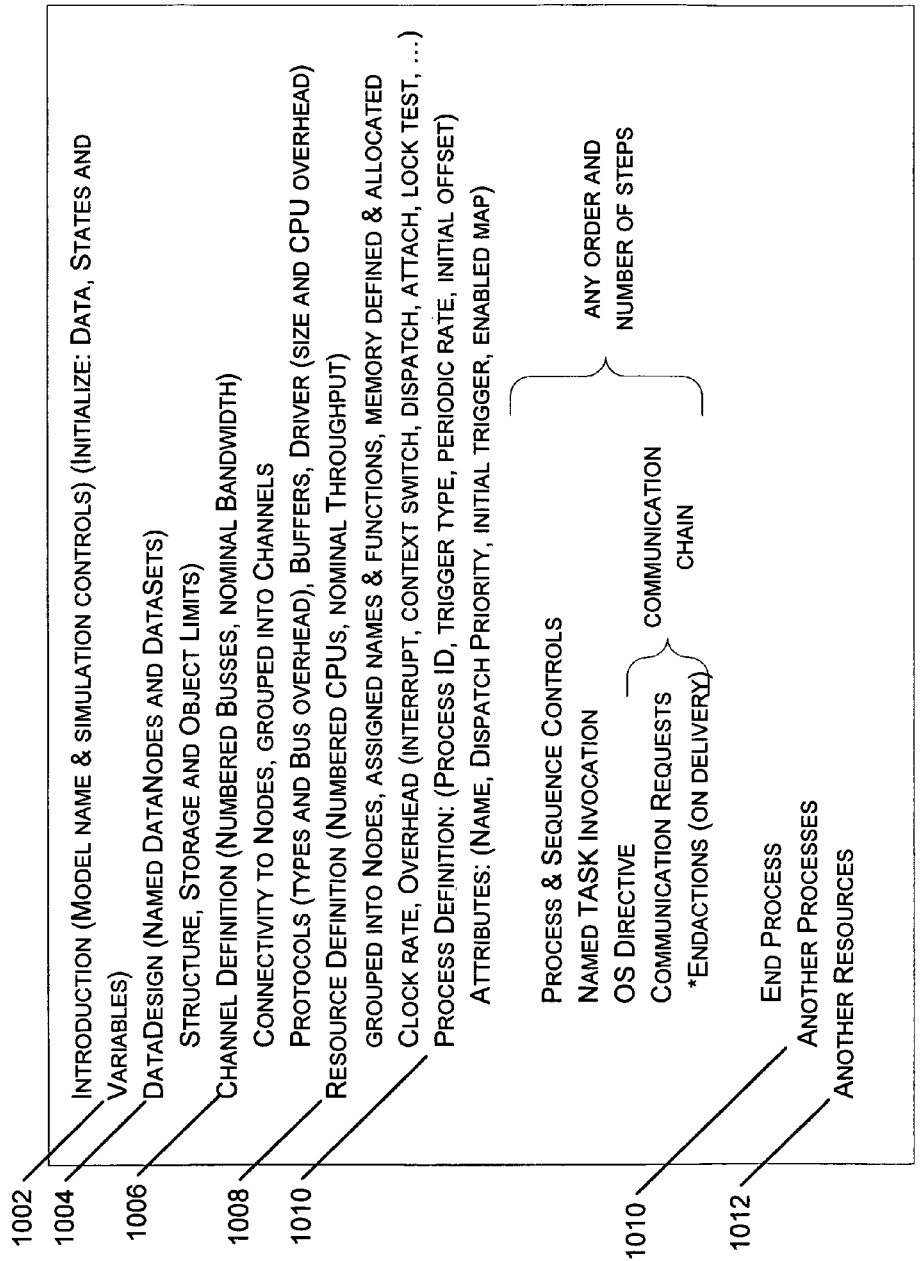
FIG. 10 is a portrayal of an embodiment of a logical organization of a language specification, in which the semantic content of the specification is dependant upon the position of language statements.

FIG. 10 describes one implementation in which the position of statements in a language description 910 describes attributes of the system. The implementation makes use of illustrative language statements. Referring to FIG. 10, line 1002 contains introductory material that includes naming the simulation. Various Simulation controls (e.g. the interval over which resource utilization will be automatically computed and random number seeding) are included. Data states are initialized (objects created and pre-positioned for the run). Variables are assigned parametric values to influence the simulation run.

Lines 1004 describe data design. Selected data nodes are defined and assigned capacity threshold limits. Data sets are assigned physical storage and structural specifications. Data sets and data nodes not explicitly defined have unlimited capacity and occupy no space. A datanode is a node abstract construct that supports simulated object flow through a system being simulated to reflect behavior. Each datanode is a defined object state and object flows are migrations between datanodes. Lines 1006 describe communication hardware. Each bus is individually defined, assigned a bus identification number and transmission bandwidth. Each bus is attached to specific processing nodes to constitute a network. Busses can be grouped together to form a more reliable maxibus or channel that dynamically shares the load. The operational protocol (standard, TCPIP, TDMA, . . . ) and various communication bus overhead parameters are specified (e.g. the inter-message gap and header size). The transmitting node overhead is specified as the work performed by the processor to setup a transmission. The size of communication buffers and port drivers can be specified.

Lines 1008 describes a resource which in one implementation is the processing hardware. Each CPU is assigned an identification number and nominal throughput capability. These processing resources can be grouped into nodes and assigned names and functions. A master clock period establishes the sync signal rate and various processing overhead cost can be specified.

Lines 1010 describe processes under a CPU. Thus, each of these indented process definition statement groupings also by virtue of their position are associated with the CPU described in lines 1008. The inventor understands that these groupings, while able to imply attributes not specifically described in a statement, are also intuitively more easy to construct, as well as convert to the database 210. The process is automatically allocated to the preceding resource and may be enabled to execute in additional CPUs within the same node. Each process is assigned a unique identifying number and specifies the trigger type: interrupt, aperiodic and periodic with a fixed period and initial phasing specified in number of sync signals. A process can be assigned priority, name, function, initial trigger time, and map of CPUs in this node that may assist in executing steps from this process. In the organization of the language specification portrayed, the processes specified following a CPU are authorized to execute the process.

The process is a high level organization composed of any number of steps. Process and sequence control steps are single sentence specifications. A task directive begins a task specification with a formal module name and optional runtime parameter. Subsequent statements define attributes of the task: physical storage, execution priority ceiling, attached data sets with Read and Write access, and additional runtime expressions. Task behavior expressions include object flows and instrumentation.

System service requests are single sentence directives (e.g. dataset backup copy).

Communication specifications begin with a Send/Command/Broadcast directive that names the transmission block and identifying the channel to which the request will be directed. An optional destination process can be appended to the communication specification differentiating between Send and Broadcast requests. Attributes include transmission priority, dataset read (source of the transmission data). Any number of message-length directives are concatenated to express the communication payload size, behavior directives can be included to model object flows and instrumentation.

End-actions are specified inline, immediately following the communication request that will eventually trigger the end-action. End-action options include Forward directives to pass the transmission onto another bus, process controls and additional Communication requests.

Any number of processes can be specified under a CPU.

Line 1012 references that other resources if any are to be specified after the line. Thus, each of these indented resource definition statement groupings also by virtue of their position is associated with the model name.

Although specific embodiments have been illustrated and described herein, it will be appreciated by those of ordinary skill in the art that a wide variety of alternate and/or equivalent implementations may be substituted for the specific embodiments shown and described without departing from the scope of the present invention. In particular, it is understood that although an embodiment to simulate the performance of a computer system has been described herein, the simulator is understood to simulate the performance of any system having multiple interacting resources and consumers. This application is intended to cover any adaptations or variations of the embodiments discussed herein. With regard to the claims, the order of description of acts or operations should not be construed to imply that these acts or operations are necessarily order dependent.

What is claimed is:

1. A computer-implemented method comprising:
   identifying predefined characteristics of a system that affect system performance, including predefined characteristics of events that trigger processes, multiple processes, and resources to be simulated;
   writing the predefined characteristics to a database in a predefined format; and
   operating upon the characteristics by a standardized routine by reading the written-to database to simulate the system's performance based on the described characteristics of the system.

2. The method of claim 1 wherein the characteristics comprise resource characteristics and process characteristics, and the writing act further comprises writing the resource characteristics and the process characteristics such that each can be modified independently of the other.

3. The method of claim 1 wherein the identifying comprises describing the characteristics in multiple language statements based on a finite grammar.

4. The method of claim 3 wherein the writing comprises converting the multiple language statements to the characteristics in the database.

5. The method of claim 4 wherein the converting the multiple language statements is performed by a compiler.

6. The method of claim 1 wherein the operating act comprises developing a timeline of utilization for at least one resource of the system, by operating upon the characteristics by the standardized routine.

7. The method of claim 1
wherein the identifying act includes identifying the following characteristics:
processes each node executes in operation,
communication connections between system nodes,
resources of each node in executing the processes; and
events that trigger processes of the system to be executed by each node in operation, correlated with the process the event triggers;
the writing act includes writing the predefined characteristics to a database in a predefined format; and
the operating act includes operating upon the characteristics by the standardized routine by reading the written-to database to simulate the system's performance based on the described characteristics of the system.

8. The method of claim 7 wherein the format comprises the resources and the processes being stored such that one can be modified independently of the other.

9. The method of claim 7 further comprising:
in response to an event, determining from the database a process to be executed based on the event and the described correlation of the event with the process;
determining from the database the described characteristics of the system; and simulating an execution of the process based on the described characteristics of the system.

10. The method of claim 9 wherein the simulating comprises simulating utilization of at least one resource based on the described characteristics of the system in the database.

11. The method of claim 9 wherein the simulating comprises simulating utilization of at least one resource as a function of time, based on the described characteristics of the system in the database.

12. The method of claim 9, wherein for multiple processes to be simulated, the simulating is in order of a relative priority of at least one of each member of a group that includes an event and a process.

13. The method of claim 9 wherein the predefined characteristics comprise identifying steps that compose each process; and wherein the simulating comprises simulating a suspension of a process at a step.

14. The method of claim 9 wherein the simulating comprises simulating a preemption of the process.

15. The method of claim 7 further comprising describing at least one of the characteristics in a language statement; wherein the characteristic is described in the database by converting the language statement into an entry in the database.

16. The method of claim 1 comprising:
reading from the database data describing the characteristics of the system including the characteristics of resources of the system; and
simulating the utilization of the resources based on the read data in response to triggered process processing requests.

17. The method of claim 16 wherein the simulating the utilization act comprises maintaining a timeline of utilization of the resource based on a simulation of processes performed by the resource.

18. The method of claim 16 wherein if the simulating act comprises simulating multiple resources, the simulating act further comprises maintaining a separate timeline for each resource.

19. The method of claim 18 wherein the simulating the utilization act comprises simulating the execution of multiple processes that execute in the resources in order of relative priority of events that trigger the processes and/or in order of relative priority of the processes.

20. The method of claim 1 wherein the operating upon the characteristics by a standardized routine act comprises:
determining the required processing to execute each process step based on the characteristics in the database; and
determining utilization of each resource that executes the processes based on the characteristics in the database.

21. The method of claim 20 wherein each process comprises task steps, the database comprises resources to execute each task step, and the performance characteristics of each process comprises the performance characteristics of each task step of the process, and the simulation of the processes comprise simulating each task step of the processes.

22. A first system for simulating a second system; the second system of the type having multiple processes and an at least one node; the first system comprising:
a processing unit;
a memory unit operationally coupled to the processing unit, to store a standardized routine and a database, the database configured to store in a predefined format predefined characteristics of the second system, and to store an identification of events to the second system that trigger second system processes to be executed by a node of the second system, with each event correlated with a process that the event triggers, and
the standardized routine usable to simulate multiple processes of the second system, the routine configured to read the database containing predefined characteristics of the second system in a predefined format, and configured to trigger a simulation of multiple processes of the second system based on the read characteristics of the second system to be stored in the database correlation between an event and a process of the second system to be triggered by the event, and to simulate an execution of the processes of the second system based on the read described characteristics of the second system, upon execution by the processing unit.

23. The first system of claim 22 wherein the second system comprises for each process, resources to execute the process; and said to simulate an execution of the process of the second system based on the read described characteristics of the second system comprises simulating utilization of at least one of the resources.

24. The first system of claim 22 wherein the predefined characteristics of the second system comprise a relative priority of the events and/or a relative priority of the processes, and the routine is configured to trigger a simulation of multiple processes based on the relative priority of the events and/or the relative priority of the processes.

25. The first system of claim 22 wherein the predefined characteristics of the second system comprise characteristics that describe the resources of the second system, and characteristics that describe the processes that each resource is to execute; and the predefined format comprises storing the characteristics of the resources separately from the characteristics of the processes such that the characteristics of the processes and the characteristics of the resources can each be modified independently of one another.

26. The first system of claim 22 wherein the second system comprises at least one resource, and the routine is further configured to simulate a utilization of each resource in simulating the processes.

27. The first system of claim 26 wherein the routine is configured to simulate task priority and/or process suspension based on the read described characteristics of the second system.

28. The first system of claim 26 wherein the routine is further configured to maintain a timeline of the utilization.

29. The first system of claim 28 wherein the routine is further configured to maintain a separate timeline of the utilization of each resource.

30. The first system of claim 22 wherein the characteristics in the database comprise:
    performance characteristics of each of the multiple processes, and
    performance characteristics of the resources to execute each of the multiple processes; and wherein
    the simulation of each of the multiple processes is based on the performance characteristics of the process and the performance characteristics of the resources to execute the process.

31. The first system of claim 30 wherein the performance characteristics of each of the multiple process comprise the required processing to execute each step of that processes.

32. One or more computer non-transitory readable media having stored thereon a plurality of instructions that, when executed by at least one processor, cause the processor to simulate a system, the system of the type having at least one process triggered by an event and at least one resource to execute a process; the simulate act comprising the following acts:
    in response to an event of the type to trigger a process of the system, identifying a triggered process of the system to simulate by reading a correlation between the event and the process described in a predefined format in a database;
    reading predefined characteristics in a predefined format in the database, of the system's resources that are to execute the process; and
    simulating an execution of the process based on the read resources to execute the process.

33. The media of claim 32 wherein the event to trigger a process of the system to be simulated comprises one of:
    an interrupt trigger event; a periodic trigger event; an aperiodic trigger event invoked from a step of a process being simulated.

34. The media of claim 33 wherein the interrupt trigger event comprises one of:
    an input/output (I/O) complete indication, a message received by the system, a power loss warning, a storage device is full indication.

35. The media of claim 33 wherein the interrupt trigger event comprises one of:
    an external interrupt event; and an operating system interrupt event.

36. The media of claim 32 wherein the reading act comprises reading the relative priority of the processes; and the simulating act comprises simulating each of the processes in an order determined by the read relative priority of each process.

37. The media of claim 32 wherein a node of the system to be simulated includes a resource; and the simulating act comprises simulating each node separately, by using independent dispatch queues for different nodes.

38. The media of claim 37 wherein the reading act comprises reading the relative priority of the process; and the simulating act comprises, for each node, simulating the execution of each of at least one process in an order determined by the read relative priority of the processes.

39. The media of claim 32 wherein a node of the system to be simulated includes a resource, and each node includes a CPU; the reading act comprises reading the processing speed of the CPU; and the simulating act comprises simulating the utilization of the CPU based on the read speed of the CPU.

40. The media of claim 32 wherein a node of the system to be simulated includes a resource and each node includes a memory; the reading act comprises reading the capacity of the memory; and the simulating act comprises simulating the utilization of the memory based on the read capacity of the memory.

41. The media of claim 32 wherein a node of the system to be simulated includes a resource; and the simulating act comprises simulating preempting a process if a resource and memory access are not waiting to complete a prior activity.

42. The media of claim 41 wherein the preempting comprises preempting a task of the process.

43. The media of claim 32 wherein a node of the system to be simulated includes a resource and a port; the reading act comprises reading the protocol of the port; and the simulating act comprises simulating the port based on the read protocol.

44. The media of claim 32 wherein a node of the system to be simulated includes a resource and the nodes form a network connected by communication paths; the reading act comprises reading the transmission size for any data that the communication paths transport in response to a request; and the simulating act comprises simulating the utilization of the communication path based on the read transmission size.

45. The media of claim 32 wherein a process comprises task steps and control steps; and the simulating act comprises simulating each of the task steps and the control steps.

46. The media of claim 45 wherein the simulating act for simulating a task step is based on the time period to execute the task step, and/or is based on the operations that compose the task step including managing data accesses for the task step.

47. The media of claim 45 wherein the simulating act for simulating a control step is based on the time period to execute the control step and/or the operations that compose the control step.

48. The media of claim 45 wherein the simulating act comprises suspending a process task step in response to a control step.

49. The media of claim 45 wherein the simulating act for simulating a task step comprises emulating data accesses to specific datasets identified in the database.

50. The media of claim 32, the acts further comprising:
    scheduling processes to be simulated based on their relative priorities;
    in response to an event, adjusting the process priorities; and
    writing the adjusted priorities to a dispatch queue.

51. The media of claim 50 wherein in response to a sync interrupt event, the acts further comprise updating suspension for periodic intervals.

52. The media of claim 50 wherein for an I/O interrupt, the instructions further comprise the act of determining the process to be scheduled based on the I/O interrupt.

53. The media of claim 50 wherein the instructions further comprise the act of simulating the performance of the system by simulating processes in the dispatch queue in order of their priority in the dispatch queue.

54. The media of claim 53 wherein the simulating processes in the dispatch queue act comprises: reading in a database performance characteristics of resources that execute the processes; reading in the database the execution attributes of the tasks that compose the processes; and determining the processing required to execute each process based on the read performance characteristics of each resource configured to executes a step of the process, and based on the read execution attributes of each step that composes the process.

55. The media of claim 54 wherein the resource is a CPU, and a performance characteristic of the CPU comprises data indicating CPU instruction throughput; and wherein an execution attribute of a task comprises an expression specifying quantity of instructions to be executed.

56. The media of claim 54 wherein resources comprise a CPU, a channel for communication, and/or a memory.

57. The media of claim 32, wherein the system is of the type having multiple processes where each event triggers a distinct process, and the identifying act includes identifying a triggered process of the system to simulate by reading a correlation between the event and the process for each event described in a predefined format in a database in response to any of the events.

58. One or more computer non-transitory readable media having stored thereon a plurality of instructions that, when executed by at least one processor, cause the processor to simulate a system having resources to execute processes of the system, the system of a type that an event triggers a process to execute of said system; the simulate act comprising:
   in response to an event that triggers a process of the system
      determining from a database configured to store predefined characteristics of the system, a process to be executed that is stored in the database as a predefined characteristic;
      determining from the database the described characteristics of the system; and
      simulating an execution of the process based on the described characteristics of the system in the database.

59. The media of claim 58 wherein the simulating comprises simulating utilization of at least one resource based on the described characteristics of the system in the database.

60. The media of claim 59 wherein the simulating utilization of at least one resource act comprises simulating task preemption and/or process suspension.

61. The media of claim 60 wherein if the simulating act comprises simulating multiple resources, the simulating act further comprises maintaining a separate timeline for each resource.

62. The media of claim 59 wherein the simulating utilization act comprises maintaining a timeline of utilization of the resource.

63. The media of claim 59 wherein the simulating utilization act comprises simulating the execution of multiple processes of the resource in order of relative priority of each process wherein the characteristics in the database include the relative priority of the processes.

64. The media of claim 58 wherein the simulating comprises simulating utilization of at least one resource of the system, based on the described characteristics in the database, along a timeline.

65. The media of claim 58 wherein for multiple processes to be simulated, the simulating is in order of a relative priority of an event and/or a relative priority of a process.

66. The media of claim 58 wherein the predefined characteristics comprise identifying steps that compose each process; and wherein the simulating comprises simulating a suspension of a process at a step.

67. The media of claim 58 wherein the simulating comprises simulating a preemption of the process.

68. The method of claim 67 wherein the simulating a preemption of the process comprises simulating interrupting a task of the process in execution.

69. The media of claim 58 comprising:
   simulating the utilization of resources of the system in executing multiple processes of the system, where each process is to execute in specific resources, the simulating based on the resource characteristics and process characteristics each described in the database.

70. The media of claim 69 wherein the simulating the utilization act comprises maintaining a timeline of utilization for each of the resources.

71. One or more computer non-transitory readable media having stored thereon a plurality of instructions that, when executed by at least one processor, cause the processor to perform acts comprising:
   reading from a preformatted database data describing predefined characteristics of a system, the data including:
      an identification of each resource that in operation of the system is to execute a process,
      throughput of each of the processing resources to execute a process, and
      characteristics of steps of each process including relative time to execute a resource and dependency lock inhibits associated with the step; and
   simulating the allocation of the resources based on the read data in response to requests to execute at least one of the processes including:
      identifying specific resources to execute the process and determining the first step in the process to be executed; and
      for each of the identified resources that in operation is to execute a process, selecting a processes to be executed by the resource,
      selecting the next step to be executed by the process, and if that step is not inhibited according to the read dependency lock inhibits, executing that next step by determining a resource execution time interval from the process step execution characteristics and from the resource capability, and allocating the process step to the resource for the determined time interval.

72. The media of claim 71 wherein the simulating the allocation of the resources act includes simulating the utilization of a resource by maintaining a timeline of utilization of the resource.

73. The media of claim 72 wherein if the simulating act comprises simulating multiple resources, the simulating act further comprises maintaining a separate timeline for each resource.

74. The media of claim 72 wherein the data includes an execution priority of each of the processes and the simulating the utilization act comprises simulating the execution of multiple processes that execute in the resources in order of relative priority of events that trigger the processes and/or in order of relative priority of the processes.

75. The media of claim 74 wherein if the simulating act comprises simulating multiple resources, the simulating act further comprises maintaining a separate timeline for each resource.

* * * * *